United States Patent
Hayashi et al.

(10) Patent No.: US 6,438,662 B1
(45) Date of Patent: Aug. 20, 2002

(54) INFORMATION PROCESSING DEVICE CAPABLE OF ALLOWING THE MAXIMUM PROCESSING PERFORMANCE OF MICROPROCESSOR

(75) Inventors: Hiroshi Hayashi; Mamoru Nagatani, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/459,931

(22) Filed: Dec. 14, 1999

(30) Foreign Application Priority Data

Dec. 14, 1998 (JP) .......................... 10-354803

(51) Int. Cl.⁷ ............................................. G06F 12/00
(52) U.S. Cl. ........................... 711/146; 711/3; 711/168
(58) Field of Search ............................ 711/1, 118, 125, 711/146, 168, 217; 710/52; 712/205, 225

(56) References Cited

U.S. PATENT DOCUMENTS

| | | | | |
|---|---|---|---|---|
| 5,148,526 A | * | 9/1992 | Nishimuki et al. | 710/52 |
| 5,551,006 A | * | 8/1996 | Kulkarni | 711/146 |
| 5,696,917 A | * | 12/1997 | Mills et al. | 711/1 |
| 5,742,791 A | * | 4/1998 | Mahalingaiah et al. | 711/146 |
| 5,768,557 A | * | 6/1998 | Kulkarni | 711/146 |
| 5,826,052 A | * | 10/1998 | Stiles et al. | 712/205 |
| 5,893,141 A | * | 4/1999 | Kulkarni | 711/118 |
| 5,913,224 A | * | 6/1999 | MacDonald | 711/125 |
| 5,968,166 A | * | 10/1999 | Kakiage et al. | 712/225 |
| 5,987,585 A | * | 11/1999 | Motoyama et al. | 712/1 |
| 6,026,478 A | * | 2/2000 | Dowling | 712/24 |
| 6,061,449 A | * | 5/2000 | Candelore et al. | 380/28 |
| 6,073,217 A | * | 6/2000 | Mahalingaiah et al. | 711/146 |
| 6,154,826 A | * | 11/2000 | Wulf et al. | 711/217 |
| 6,226,722 B1 | * | 5/2001 | Shippy et al. | 711/168 |
| 6,226,738 B1 | * | 5/2001 | Dowling | 712/225 |

FOREIGN PATENT DOCUMENTS

JP 62-145445 6/1987

* cited by examiner

*Primary Examiner*—David Hudspeth
*Assistant Examiner*—Fred F. Tzeng
(74) *Attorney, Agent, or Firm*—Foley & Lardner

(57) ABSTRACT

Into the address storage unit 12, the address of memory to be accessed by the microprocessor 6. The bus conversion unit 16 gets the address, that is accessed by the outside device 10, to make the address storage unit 14 store, when the outside device 10 accesses the main memory 8. The memory decision unit 18 compares addresses stored by the address storage units 12 and 14, when the microprocessor 6 reads data from the main memory 8. If the two addresses differ each other, makes the microprocessor 6 access the cache memory 4 and if the two addresses are identical, makes access the main memory 8.

6 Claims, 5 Drawing Sheets

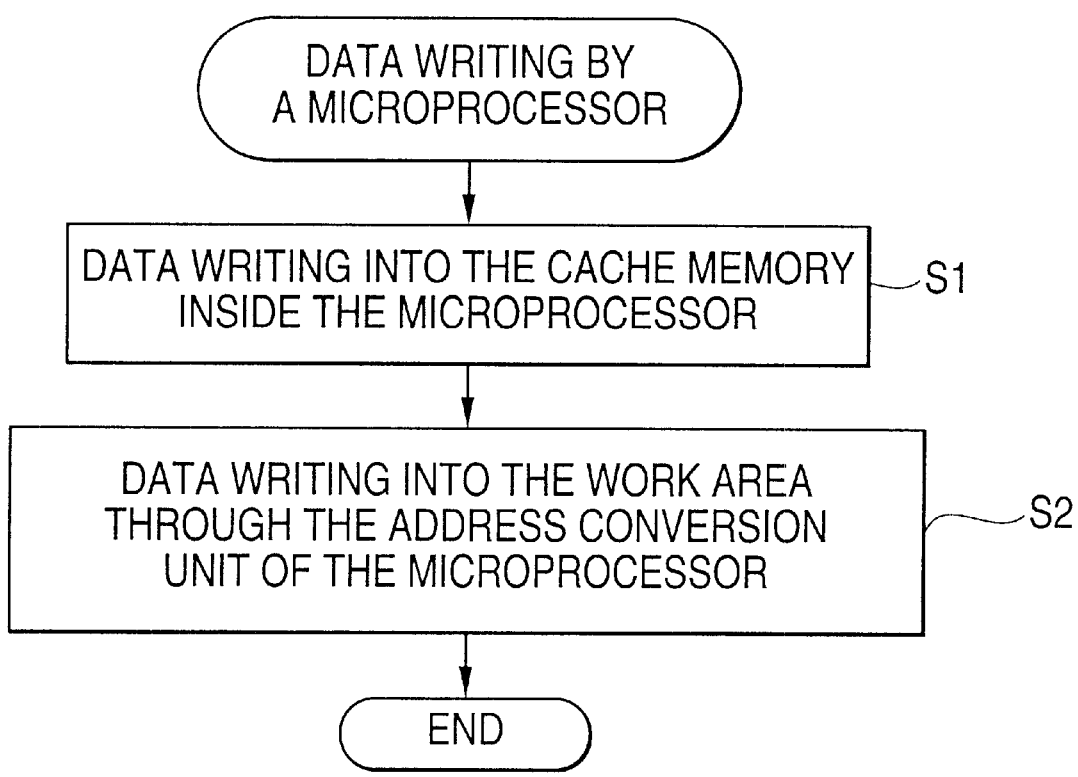

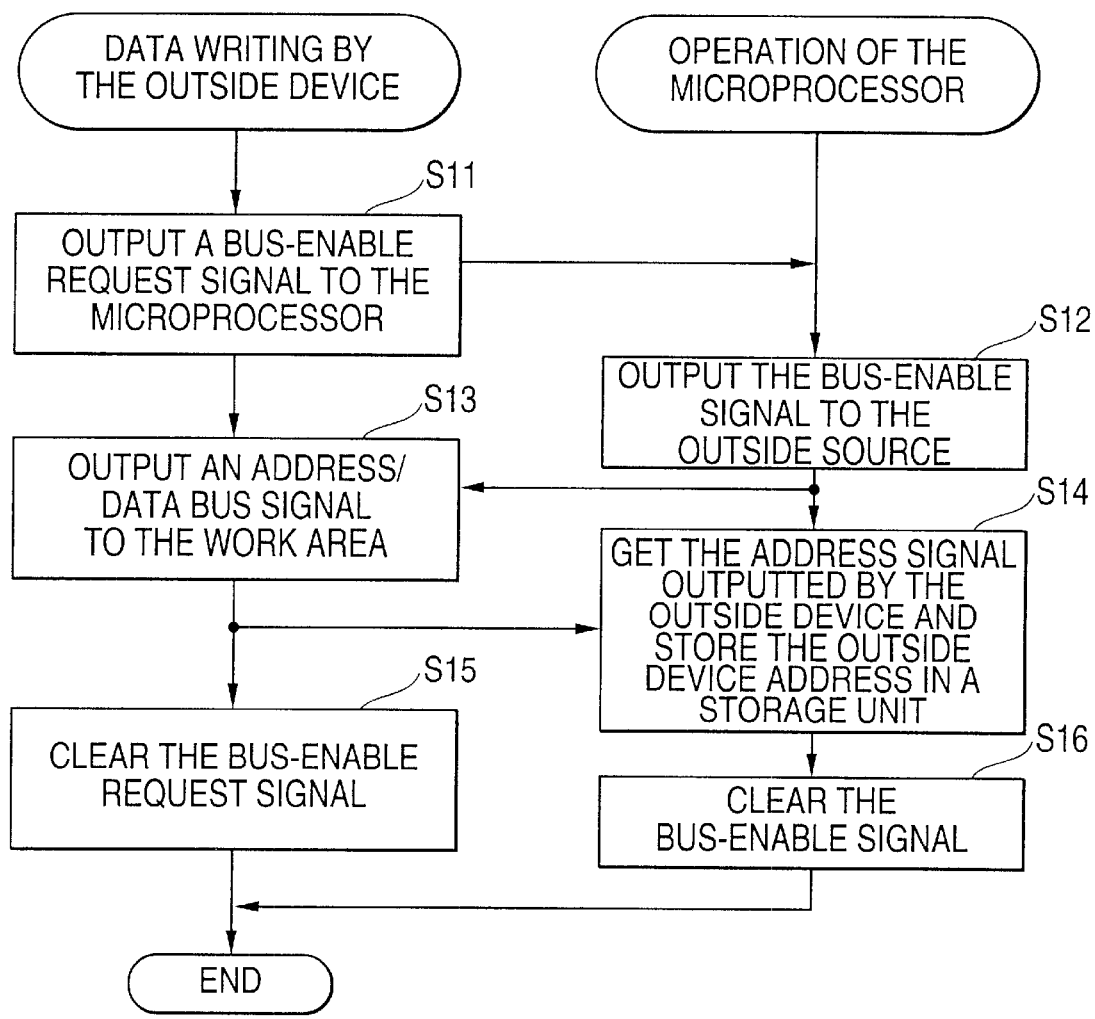

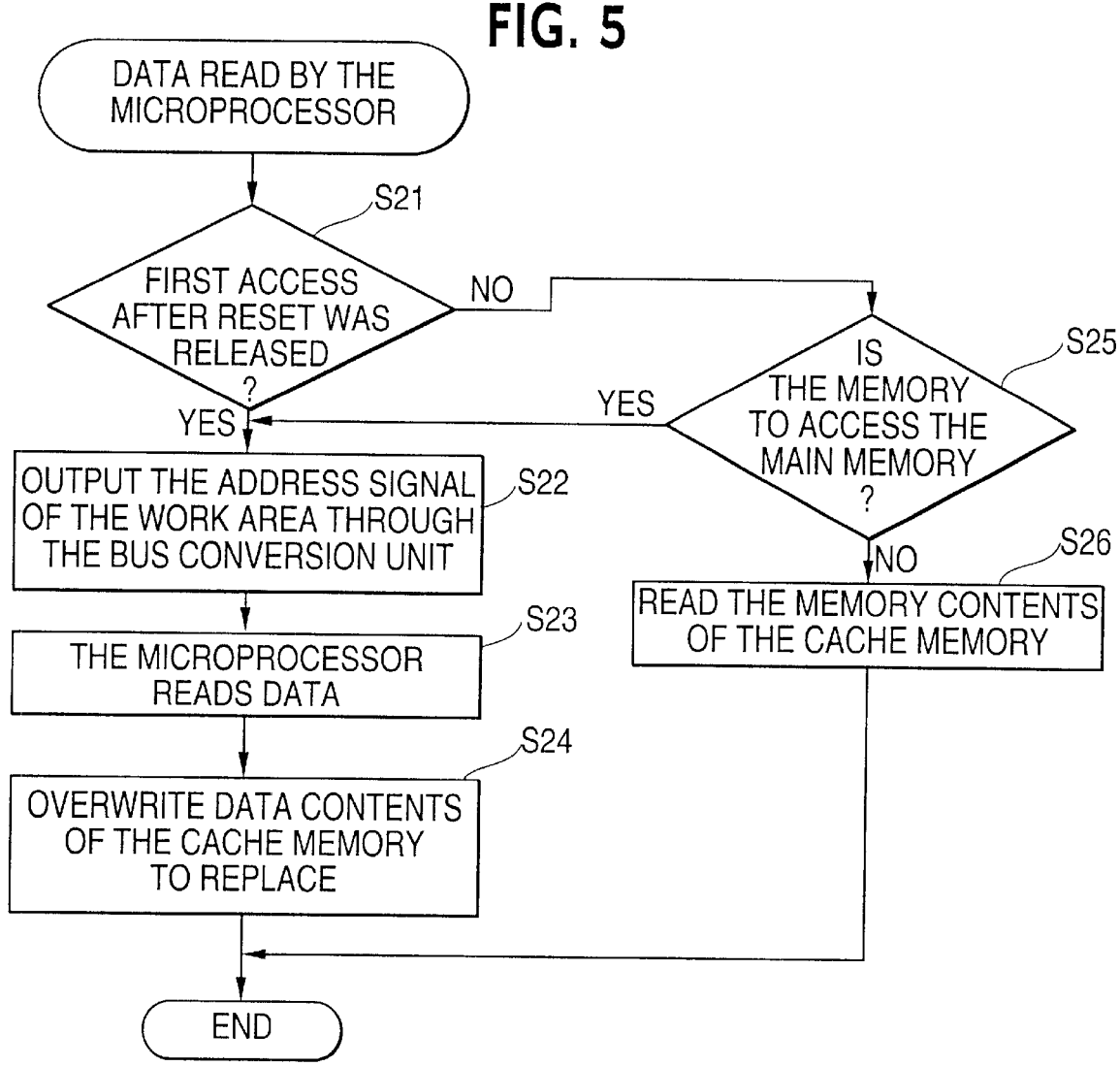

INFORMATION PROCESSING DEVICE CAPABLE OF ALLOWING THE MAXIMUM PROCESSING PERFORMANCE OF MICROPROCESSOR

BACKGROUND OF THE INVENTION

The present invention relates to an information processing device comprising a microprocessor having a cache memory.

In recent years, according to gradual increase of processing speed of a microprocessor, the information processing device, in which a cache memory is installed inside the microprocessor to realize a high speed processing of memory access, has been popularized. In such information processing device a program data and a part of other data stored in the memory (main memory, herewith) installed outside microprocessor are stored in the cache memory inside the microprocessor and the microprocessor accesses the cache memory by replacing to the main memory access to allow getting data from the memory with a high speed.

Meanwhile, in such information processing device, when the outside device operates direct memory access (DMA), for example, by a bus master function to renew the contents of the main memory by the outside device, data held by the cache memory inside the microprocessor and data held by the main memory do not correspond each other. Therefore, after DMA by the outside device, the contents of all the cache memory are once cleared together with the program data and other data.

As the result, for a short time after DMA, the microprocessor gets data from not the cache memory, but the main memory to need tome of memory access resulting in processing performance of the microprocessor.

Then, in order to solve this problem, for example, unexamined Japanese Patent Publication Sho62-145445, namely, No.145445/1987, discloses a method in which management is operated by dividing the cache memory into data area and code area and according to situation, only one area, for example the data area is cleared to keep a certain hit rate of the cache memory, even after DMA has been operated.

However, in this method the cache memory is divided into small areas to cause that data are stored in entire area in the one area, but data are stored in a part of the other area. Thus, the following problem occurs: as a whole, the cache memory cannot be effectively used.

SUMMARY OF THE INVENTION

It is therefore an object of the present invention to provide an information processing device allowing the maximum processing performance for the microprocessor by making possible the effective application of the cache memory, even after the outside device directly accessed the main memory.

Other objects of the present invention will become clear as the description proceeds.

In order to accomplish the above object, the present invention provides an information processing device comprising a microprocessor containing a cache memory, a main memory installed in the outside of said microprocessor to be accessed by said microprocessor, and an outside device to access directly said main memory, wherein said microprocessor comprises the first address storage means to store an address of said main memory to be accessed by said microprocessor, the second address storage means to store the address of said main memory to be accessed by said outside device, a controlling means of address storage to make the second address storage means store by getting the address, to which said outside device accesses, from said outside device, when said outside device accesses said main memory, a controlling means of access memory compares addresses stored by said first and second address storage means when said microprocessor reads a datum from said main memory, if the two addresses differ each other, makes said microprocessor access said cache memory and if the two addresses are identical, makes said microprocessor access said main memory.

In information processing device of the present invention, the controlling means of address storage gets an address, which the outside device accesses, from the outside device to make the second address storage means store, when the outside device accesses the main memory. The access memory controlling means compares addresses stored by the first and the second address storage means, when the microprocessor reads data from the memory. If the two addresses differ each other, make said microprocessor access said cache memory. On the other hand, if said two addresses are identical, make said microprocessor access said main memory.

Therefore, as the result of renewal of stored contents by accessing of the main memory by the outside memory, even if stored contents of the cache memory differs from those of the main memory, when the microprocessor reads data from the address, the microprocessor is automatically controlled to read data from the main memory and not from the cache memory.

Therefore, in the information processing device of the present invention, the maximum processing performance is realized for the microprocessor by making possible the effective application of the cache memory without conventional clearing of the cache memory, even after the outside device renewed the stored contents of the main memory.

BRIEF DESCRIPTION OF THE DRAWINGS

FIG. 3 is a flow chart showing the action when the microprocessor writes data into the memory;

FIG. 4 is a flow chart showing the action when the outside device writes data into the main memory; and FIG. 5 is a flow chart showing the action when the microprocessor reads data from the memory.

DETAILED DESCRIPTION OF THE PREFERRED EMBODIMENTS

Referring now to FIGS. 1 through 5, description will proceed to an information processing device according to a preferred embodiment of the present invention.

Figure 1:
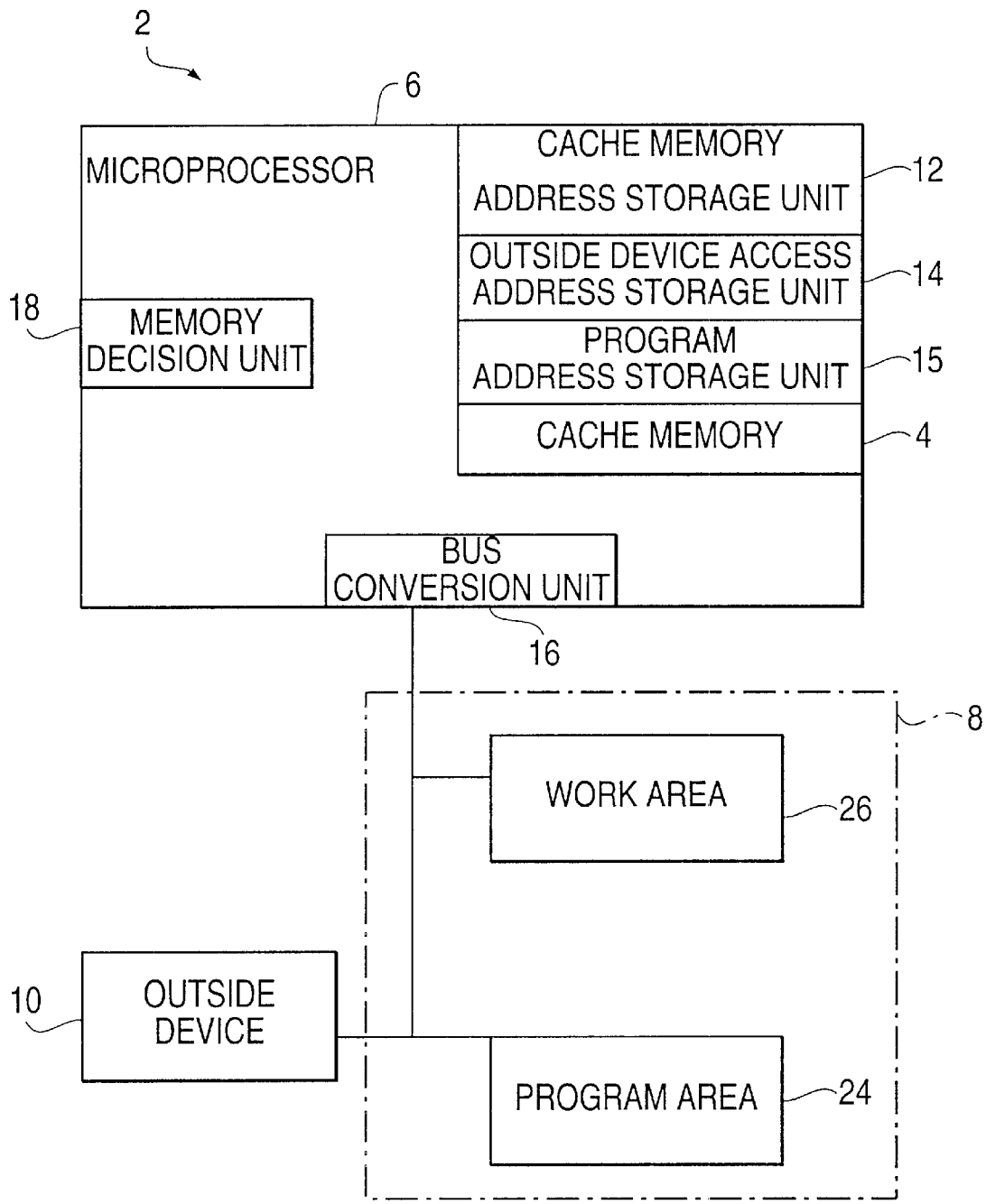
FIG. 1 is a constitutional view of the principal units of the information processing device of the present invention.
Figure 2:
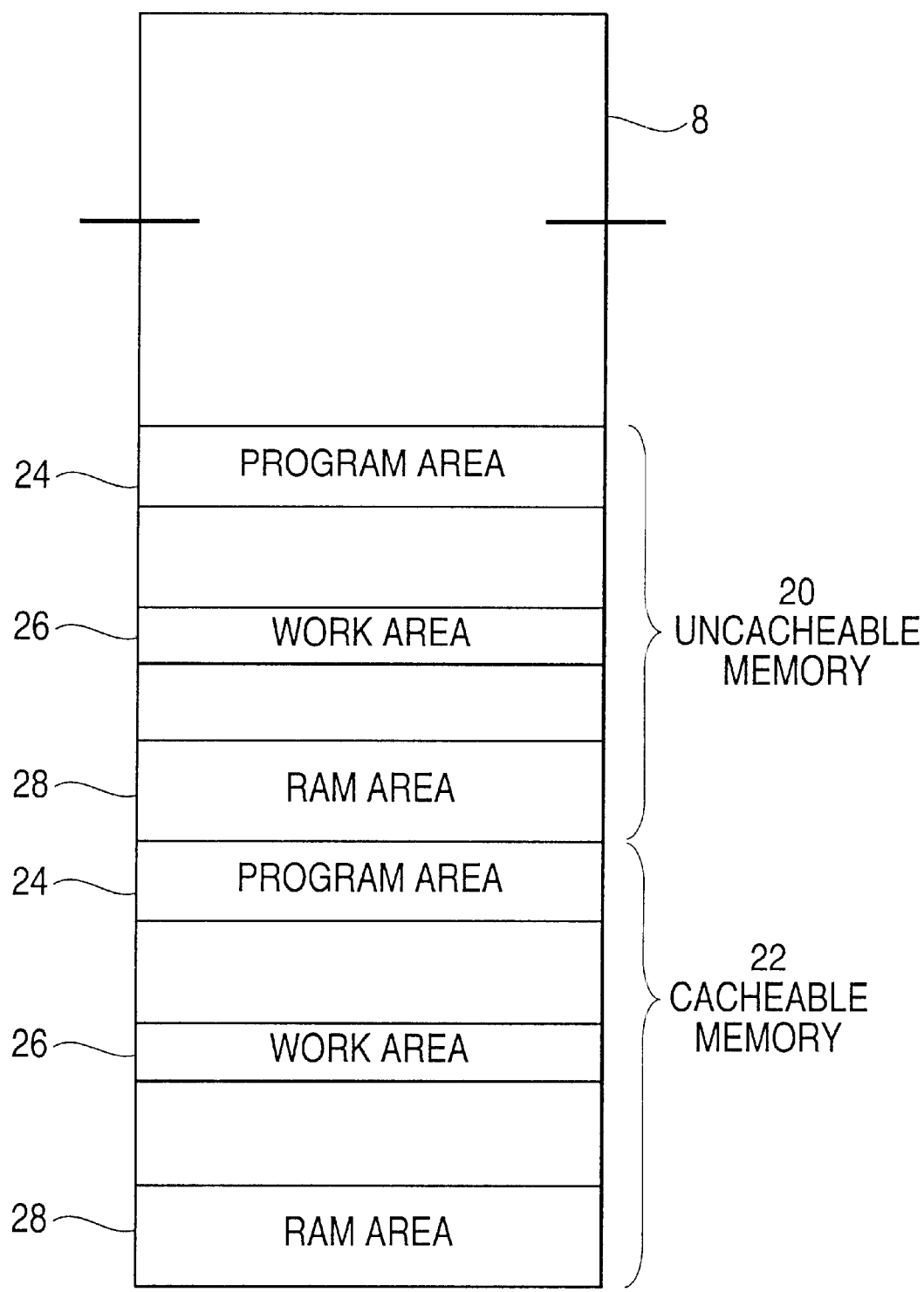
FIG. 2 is a memory map figure showing the main memory constituting of the information processing device of the FIG. 1.

FIG. 1 is a constitutional view showing principal units of the information processing device of the present invention while FIG. 2 is a memory map figure showing the main memory constituting of the information processing device of the FIG. 1.

As shown in the FIG. 1, the information processing device of the preferred embodiment 2 comprises the microprocessor 6 containing the cache memory 4, the main memory 8 installed outside the microprocessor 6 to be accessed by the microprocessor 6, the outside device 10 to access directly the main memory 8.

Furthermore, the microprocessor 6 comprises address storage units 12, 15, a bus conversion part 16, and a memory decision unit 18.

The address storage unit 12 (the first address storage means of the present invention) stores the address of the main memory 8 to be accessed by the microprocessor 6. On the other hand, the address storage unit 14 (the second address storage means of the present invention) stores the address of the main memory 8 to be accessed by the outside device 10.

The bus conversion unit 16 (works as the controlling means of address storage of the present invention) get the address, which is accessed by the outside device 10, from the outside device 10, when the outside device 10 accesses the main memory 8 to make the second address storage means store.

The memory decision unit 18 (the access memory controlling means of the present invention) compares addresses stored by the address storage units 12 and 14, when the microprocessor 6 reads data from the main memory 8. If the two addresses differ each other, makes said microprocessor 6 access the cache memory 4 and if the two addresses are identical, makes said microprocessor 6 access said main memory 8.

In the preferred embodiment, the bus conversion unit 16 works also as an address conversion means of the present invention, the bus conversion unit 16 does address conversion between the logic address and the physical address.

The microprocessor 6 generates the logic address inside to access the cache memory 4 and the main memory 8 The cache memory 4 is accessed by the logic address, the address storage units 12 and 14 stores the logic address, and when the microprocessor 6 accesses the main memory 8, the logic address generated by the microprocessor 6 is converted to the physical address by the bus conversion unit 16 to supply to the main memory 8. In addition, the bus conversion unit 16 converts the physical address outputted by the outside device 10 to the logic address, finally to make the address storage unit 14 store.

In the preferred embodiment, as shown in the FIG. 2 in detail, the main memory 8 comprises a cacheable memory 20 and an uncacheable memory 22, storage contents of the cacheable memory 20 is stored in the cache memory 4, the microprocessor 6 accesses the cache memory 4 to allow getting data with a high speed.

The outside device 10 accesses the uncacheable memory 22, the memory decision unit 18 makes access the microprocessor 6 to the uncacheable memory 22, when two addresses stored in the address storage units 12 and 14 are identical.

More specifically, the cache memory 4 and the uncacheable memory 22, respectively, comprise a program area to store a program data for operation of the microprocessor 6 and a work area to store data other than the program data, the program area 24 comprises ROM, the work area 26 comprises RAM. The cache memory 4 and the uncacheable memory 22 further comprise RAM area 28 of uncertain usage.

The outside device 10 accesses the work area 26 of the uncacheable memory 22; if said two addresses are identical, the memory decision unit 18 makes the microprocessor 6 access the work area 26 of the uncacheable memory 22.

The microprocessor 6 accesses the program area 24 of the main memory 8 on the basis of the address stored in the address storage unit 15.

Next, referring to FIGS. 3 through 5, description will proceed to an operation of the information processing device according to the preferred embodiment of the present invention. The following is the description of action of the information processing device 2 with such constitution.

FIG. 3 is a flow chart showing the action when the microprocessor 6 writes data into the memory. FIG. 4 is a flow chart showing the action when the outside device 10 writes data into the main memory 8. FIG. 5 is a flow chart showing the action when the microprocessor 6 reads data from a memory.

The following is description of action, when the microprocessor 6 writes data into the memory, with reference to FIG. 3.

When the microprocessor 6 writes data into the memory, the microprocessor 6 outputs the logic address of the address, into which data are written, to the cache memory 4. And write the data into said logic address of the cache memory 4 (step S1.) Simultaneously, the logic address outputted to the cache memory 4 by the microprocessor 6 is converted to the physical address by the bus conversion unit 16 to supply to the main memory 8. Said data outputted by the microprocessor 6 is also written into both the work areas 28 of the cacheable memory 20 and the uncacheable memory 22 (step S2.)

Subsequently, the following is description of action, when the outside device 10 writes data into the main memory 8, with reference to FIG. 4

When the outside device 10 writes data into the work areas 28 of the uncacheable memory 22 by DMA, for example, by the bus master function, the outside device 10 first send a signal to request enabling a bus for the microprocessor 6 (step S11) to wait enable signal from the microprocessor 6.

In contrast, receiving a bus-enable request signal from the outside device 10, the microprocessor 6 issues a bus enabling signal to the outside device 10 (step S12.)

When receiving the bus enabling signal from the microprocessor 6, the outside device 10 generates an address signal (physical address) and a data signal by itself to supply to the main memory 8 and write the data into the work area 26 of the uncacheable memory 22 (step S13.) Then, the bus conversion unit 16 receives the address expressing the physical address outputted by the outside device 10 to make the address storage unit 14 store after conversion to a logic address (step S14.)

After finishing data writing, then the outside device 10 clears the bus enabling signal (step S15.) By this step, the microprocessor 6 clears the bus enabling signal (step S16,) to complete DMA operation by the outside device 10.

The following is description of action, when the microprocessor 6 reads data from the memory, with reference to FIG. 5.

When reading data from the memory, the microprocessor 6 decides immediately after or not turning on of the power source of the information processing device 2 (step S21.) If the decision result is Yes, data in the cache memory has been all cleared and then, the microprocessor 6 outputs the address of the main memory 8 through the bus conversion unit 16 (step S22,) to read all the data from the main memory 8 through the bus conversion unit 16 (step S23.) Then, the data read from the main memory 8 is overwritten on the address corresponding to that of the cache memory 4 (step S24.)

When the microprocessor 6 reads data from the memory, address thereof is stored in the address storage unit 12 to output to the main memory 8 through the bus conversion unit 16.

On the other hand, if the result of decision in the step 21 is No, the memory decision unit 18 compares addresses stored in the address storage units 12 and 14 (step S25;) if the two addresses differ each other (No in the step S25,) allows the microprocessor 6 to access the cache memory 4 (step S26;) on the other hand, if the two addresses are identical (Yes in the step 25,) allows the microprocessor 6 to access the work area 26 of the uncacheable memory 22 (step S33.) After this step, the microprocessor 6 gets data from said the work area 26 (step S23,) the data read from the main memory 8 is overwritten on the address corresponding to that of the cache memory 4 (step S24) to complete the operation to read data from the memory by the microprocessor 6.

As seen from these steps, in the information processing device 2 of the present embodiment, if difference occurs between memory contents of the cache memory 4 and the main memory 8 as the result of renewal of memory content by access of the outside device 10 to the main memory 8, the microprocessor 6 is automatically controlled to read data from the main memory 8 and not from the cache memory, when the microprocessor 6 reads data from the address thereof.

Therefore, in the information processing device 2, even after the outside device 10 renewed memory content of the main memory 8, the cache memory 4 may not clear as conventional system and the maximum processing performance is realized for the microprocessor by making possible the effective application of the cache memory 4.

In the preferred embodiment, it is described that the outside device 10 operates DMA. Regardless of this example, the present invention is effective for the information processing device 2, in which the outside device 10 directly accesses the main memory 8 in any modes other than DMA.

Further in the preferred embodiment it is described that the main memory 8 is divided into the uncacheable memory 20 and the cacheable memory 22. The present invention is of course effective for the case in which the main memory 8 is divided into such two units.

Furthermore in the preferred embodiment, it is described that the cacheable memory 4 and the uncacheable memory 20 comprises the program area 24, the work area 26, and RAM area 28 of uncertain usage. The present invention is effective for the information processing device 2, in which the memory is not divided into such areas.

As described before, in the information processing device of the preferred embodiment, the address storage controlling means gets the address, that is accessed by the outside device, from the outside to make the second address storage means store, when the outside device accesses the main memory. Then, the access memory controlling means compares addresses stored by said first and second address storage means, when the microprocessor reads data from the memory; if the two addresses differ each other, makes the microprocessor access the cache memory and on the other hand if the two addresses are identical, makes the microprocessor access the main memory.

Therefore, as the result of renewal of stored contents by accessing of the main memory by the outside memory, even if stored contents of the cache memory differs from those of the main memory, when the microprocessor reads data from the address, the microprocessor is automatically controlled to read data from the main memory and not from the cache memory.

Therefore, in the information processing device of the preferred embodiment, the maximum processing performance is realized for the microprocessor by making possible the effective application of the cache memory without conventional clearing of the cache memory, even after the outside device renewed the stored contents of the main memory.

What is claimed is:

1. An information processing device comprising:

a microprocessor having a cache memory;

a main memory installed outside of said microprocessor and accessible by said microprocessor; and an outside device having direct access to said main memory, said microprocessor comprising:

a first address storage for storing an address of said main memory to be accessed by said microprocessor, a second address storage for storing and address of said main memory accessed by said outside device, an address storage controller for controlling the second address storage to store addresses accessed by the outside device, and a memory access controller for comparing addresses stored by said first address storage and second address storage and, if the addresses differ, making said microprocessor access said cache memory, and if the addresses are identical, making said microprocessor access said main memory.

2. An information processing device according to claim 1, wherein said microprocessor comprises an address conversion means for converting an address between a logic address and a physical address, said microprocessor generating said logic address inside in order to access said cache memory and said main memory, said cache memory being accessed using said logic address, said first address storage and second address storage storing said logic address, when said microprocessor accesses said main memory, said logic address generated by said microprocessor being converted to a physical address by said address conversion means to supply to said main memory, said address storage controller converting a physical address outputted by said outside device to said logic address by said address conversion means for storage in said second address storage.

3. An information processing device according to claim 1, wherein said main memory comprises a cacheable memory and an uncacheable memory, said outside memory accessing said uncacheable memory, said address storage controller making said microprocessor access said uncacheable memory when said addresses stored by said first address storage and second address storage are identical.

4. An information processing device according to claim 3, wherein said cacheable memory and said uncacheable memory, respectively, comprise a program area for storing a program data for operation of said microprocessor and a work area for storing data other than said program data, said program area comprising ROM, said work area comprising RAM.

5. An information processing device according to claim 3, wherein said outside device accesses the work area of the uncacheable memory, said address storage controller making said microprocessor access said work area of said uncacheable memory when said addresses stored by said first address storage and second address storage are identical.

6. An information processing device according to claim 1, wherein said outside device comprises a master.

* * * * *